(12) United States Patent
Herold et al.

(10) Patent No.: US 12,703,300 B2
(45) Date of Patent: Aug. 11, 2026

(54) TESTING METHOD FOR HEADLAMPS, AND TESTING DEVICE

(71) Applicant: Hella GmbH & Co. KGaA, Lippstadt (DE)

(72) Inventors: Florian Herold, Bielefeld (DE); Ingo Möllers, Rietberg (DE); Wolf Alexander Quitsch, Beckum (DE); Dieter Schiller, Geseke (DE); Alexander Schwan, Kamen (DE); Johannes Wiedenstritt, Wadersloh (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 226 days.

(21) Appl. No.: 18/608,362

(22) Filed: Mar. 18, 2024

(65) Prior Publication Data

US 2024/0317138 A1 Sep. 26, 2024

(30) Foreign Application Priority Data

Mar. 20, 2023 (DE) ........................ 102023106878.4

(51) Int. Cl.
*G01R 31/00* (2006.01)
*B60Q 11/00* (2006.01)

(52) U.S. Cl.
CPC ........ *B60Q 11/005* (2013.01); *B60Q 2200/38* (2013.01)

(58) Field of Classification Search
CPC . G01R 31/44; G01R 31/2635; G01M 11/064; G01M 11/065; B60Q 11/005
See application file for complete search history.

(56) References Cited

U.S. PATENT DOCUMENTS

2018/0066985 A1* 3/2018 Gut ........................ F21S 45/70
2018/0283637 A1* 10/2018 Murakami ......... H05B 45/3725
2021/0112647 A1* 4/2021 Coleman ................ G01S 17/42
2023/0108612 A1* 4/2023 Ota ..................... B60Q 1/1423 362/523

FOREIGN PATENT DOCUMENTS

DE 102012224323 * 6/2014
DE 102014015796 B4 10/2017
DE 102016118801 A1 4/2018
DE 102018114121 A1 12/2019
DE 102020000292 A1 9/2020
DE 102021108176 A1 10/2021

* cited by examiner

*Primary Examiner* — Thang X Le
(74) *Attorney, Agent, or Firm* — Husch Blackwell LLP

(57) ABSTRACT

A quality testing method is provided for a light source in a headlamp, in which the light source contains a matrix of light pixels that can be controlled individually. The light pixels are activated individually according to a test procedure, such that the light source emits light corresponding to a test pattern. The test pattern is recorded by an optical recorder, and the test pattern is compared with a reference pattern with regard to brightness and/or color value.

13 Claims, 3 Drawing Sheets

TESTING METHOD FOR HEADLAMPS, AND TESTING DEVICE

CROSS REFERENCE

This application claims priority to German Application No. 10 2023 106878.4, filed Mar. 20, 2023, the entirety which is hereby incorporated by reference.

FIELD OF THE INVENTION

The invention relates to a quality testing method for a light source in a headlamp, in which the light source contains a matrix of light pixels that can be activated individually.

The invention also relates to a testing device for such a testing method.

BACKGROUND OF THE INVENTION

A quality testing method for a light source is disclosed in DE 10 2021 108 176 A1, in which different light pixels, or LEDs, are switched on successively, and the forward bias at each LED is measured. If this forward bias lies outside a predefined forward bias range, the LED in question is classified as faulty. This method thus identifies faulty and functional LEDs on the basis of electrical measurements.

A quality testing method for a headlamp is disclosed in DE 10 2014 015 796 B4 in which the brightness and color of a headlamp are determined on the basis of the light distribution from the headlamp on a road. The light pixels in the headlamp are activated for this, such that a light distribution is generated in front of the vehicle that corresponds to a test pattern. This test pattern is recorded by an optical recorder and compared with a predefined reference pattern that has been stored. It is then determined in an evaluation unit whether or not the headlamp is functioning properly on the basis of the light distribution. The disadvantage with this is that optical light conductors in the headlamp affect the measurement results.

BRIEF SUMMARY OF THE INVENTION

The object of the present invention is to create a quality testing method for light sources and a testing device with which a more precise quality measurement can be easily obtained.

These problems are solved in that the light pixels are activated individually according to a test procedure, such that the light sources emit light corresponding to a test pattern, the test pattern is recorded by an optical recorder, and the test pattern is compared with a reference pattern with regard to brightness and/or color value.

One advantage of the invention is that it is possible to evaluate contrast with the method according to the invention. A test pattern obtained with a light source composed of numerous light pixels is recorded. The subject of the test is therefore only the light source containing numerous light pixels that can be activated individually. The fundamental idea of the invention is therefore to measure the light at the source, evaluate it, and derive the quality of the individual light pixels therefrom.

According to a preferred embodiment of the invention, numerous test patterns are generated and recorded through successive activation of different light pixels, in which the light pixels in the test pattern that are switched on are surrounded by a predefined number of light pixels that are switched off. Advantageously, there is no interaction between adjacent light pixels that are switched on. This allows for light pixels of different contrasts to be recorded and evaluated. This makes it possible to easily evaluate contrasts and differences in homogeneity between adjacent light pixels.

According to one development of the invention, the test pattern is composed of numerous light pixel arrays of the same size, each of which has the same number of light pixels. Different individual light pixels are switched on successively in each pixel array, while the other light pixels remain off. The number of test patterns corresponds to the number of light pixels in each light pixel array. Larger light pixel arrays can be more precisely evaluated with regard to contrast.

According to one development of the invention, the light pixels at the same locations in the respective light pixel arrays are switched on, while the other light pixels in the same light pixel array remain off. This ensures that a defined, or the same, spacing between the light pixels that are switched on is obtained in different and/or adjacent light pixel arrays. The light pixels that are switched on are therefore at the same spacing to one another in each test pattern. The only difference is that all of the light pixels that are switched on for each test pattern "wander" by one position along a row and/or column. This advantageously results in a reliable quality evaluation of the individual light pixels.

According to one development of the invention, test patterns are generated in a first step that have relatively small light pixel arrays. This reduces the number of test patterns. If it is determined that the contrast does not exceed a predefined threshold value, a second measurement takes place in a second step with a second test pattern, in which the light pixel arrays are larger than those in the first step. A precise determination of the contrast can first be obtained with the second measurement. This two-step measurement process advantageously means that a time-consuming quality testing or measurement only takes place when a predefined quality cannot be determined by the first measurement.

According to one development of the invention, the evaluation takes place by comparing the recorded test pattern with a reference pattern. By this means, light pixels with a relatively low contrast can be detected, and by activating adjacent light pixels, it is possible to compensate for them, such that the desired light distribution is obtained. By way of example, high contrast adjacent light pixels can be dimmed incrementally, in order to balance out the overall brightness. By evaluating the test measurement, operating control signals can be generated with which the individual light pixels can be controlled to generate a predefined light distribution. An optimal light distribution can be obtained in this manner, e.g. a low-beam light distribution or a non-blinding light distribution. This allows for inhomogeneities in the light distribution caused by light pixels of different contrasts to be compensated for.

An evaluation unit in the testing device is used to determine an operating control signal with which all of the light pixels in the light source are controlled to generate a predefined light distribution in conjunction with an optical unit. Inhomogeneities in the light distribution that are not otherwise visible can advantageously be compensated for by this means.

According to one development of the invention, the test control unit is configured to switch on just one light pixel in a light pixel array with an activation signal. The other pixels in the respective light pixel array remain off. By this means, a predefined spacing between the light pixels that are switched on in the light source can be maintained, in order to determine the contrast of the individual light pixels.

According to one development of the invention, the operating control signal is stored in a memory in a control unit for the headlamp, such that it can be used to generate the predefined light distribution.

According to one development of the invention, the optical recorder is a camera, such that it is possible to determine the brightness or color value through image evaluation. The brightness values and/or color values can be easily compared to predefined brightness values and color values in the reference patterns.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
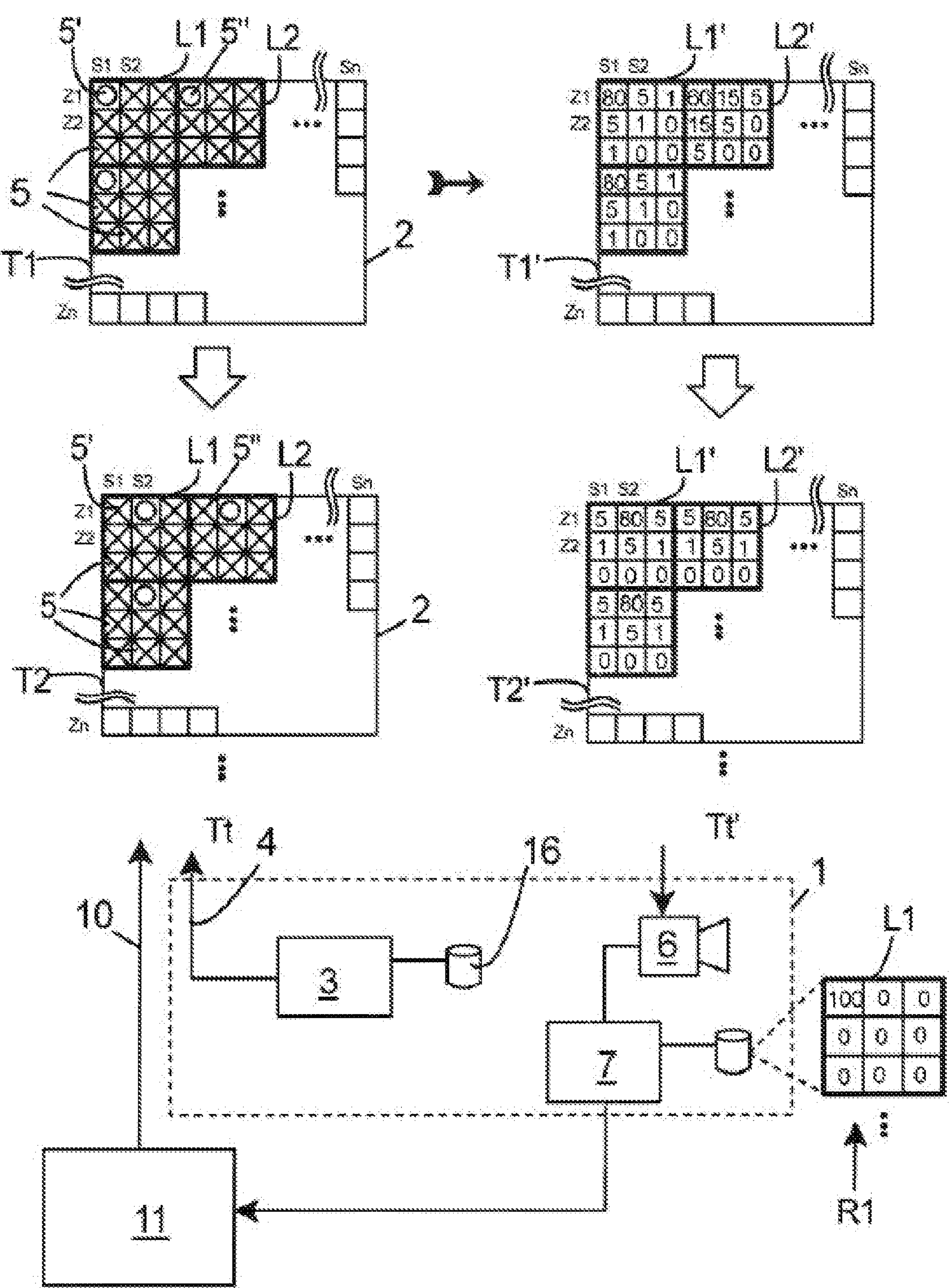
FIG. 1 shows a schematic illustration of a testing device according to the invention.
Figure 2:
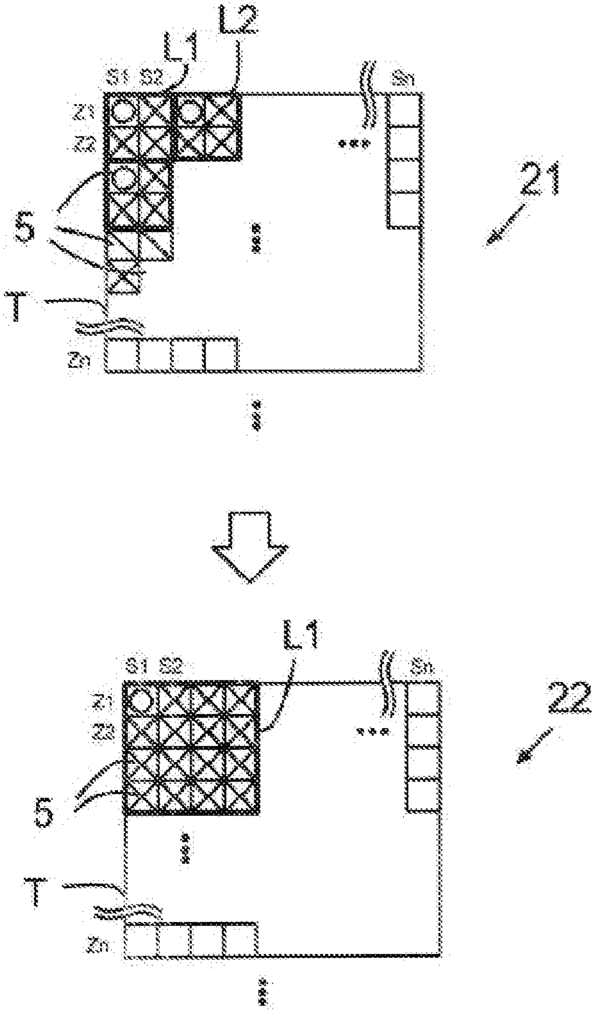
FIG. 2 shows a schematic illustration of light pixel arrays of different sizes.

A testing device 1 for testing the quality of a light source 1 is substantially composed of a test control unit 3 with which a test control signal 4 for controlling light pixels 5 in the light source 2 that can be activated individually can be generated, an optical recorder 6 for recording test patterns T1, T2, . . . $T_t$, and an evaluation unit 7.

The light source 2 is composed of numerous identical light pixels 5, which are formed by LEDs on a single chip. By way of example, 16,000 light pixels 5 can be placed on a printed circuit board.

The test control unit 3 contains means for generating numerous test patterns T1, T2, . . . $T_t$, and the individual light pixels 5 are switched on and off by the test control signals 4 contained in the test patterns T1, T2, . . . $T_t$. The individual light pixels 5 are either switched on by the test control signal 4 with a standard voltage (indicated by a circle in the drawings), or switched off by a zero voltage (indicated by an X in the drawings).

The test patterns T1, T2, . . . $T_t$ contain a number of rows Z1, Z2, . . . $Z_n$ and columns S1, S2, . . . $S_n$, and the light pixels are arranged in a matrix.

The test patterns T1, T2, . . . $T_t$ each contain a number of groups of light pixels of the same size, specifically the light pixel arrays L1, L2, . . . $L_l$.

After a first test pattern T1, a second test pattern T2 is generated in a second step, which differs from the first test pattern T1 in that light pixels 5 at different locations in the respective light pixel arrays L1, L2, . . . $L_l$ are switched on, while the other light pixels in the same light pixel arrays L1, L2, . . . $L_l$ are switched off.

In the present exemplary embodiment of the test pattern T1, the light pixel 5 in row Z1, column S2 in the respective light pixel arrays L1, L2, . . . $L_l$ is switched on. The optical recorder 6 records the first test pattern T1 as test pattern T1', when the first test patterns T1 is active. The optical recorder 6 detects a second test pattern T2' when the second test pattern T2' is active. Other test patterns are then generated, until all of the light pixels 5 in each of the light pixel arrays L1, L2, . . . $L_l$ have each been switched on once. In the present exemplary embodiment, the light pixel arrays L1, L2, . . . $L_l$ are each composed of nine light pixel positions (locations), such that nine test patterns, in which t=9, are generated. Nine test patterns T' are therefore recorded, and compared with the respective reference patterns R1, . . . R9 in the evaluation unit 7. The test patterns T1, T2, . . . T9 are therefore generated sequentially, the recorded test patterns T1', T2', . . . T9' are then sequentially stored in the evaluation unit 7, and compared with the reference patterns R1, . . . R9.

The evaluation in the evaluation unit 7 takes place by comparing the test patterns T1', T2', . . . T9' with the reference patterns R1, . . . R9 with regard to brightness and/or color value, or a color coordinate. By way of example, the brightness values of each recorded light pixel 5 are recorded in FIG. 1 in the test patterns T1', T2'. A brightness of 80% of the normal brightness is detected at the light pixel location in row Z1, column S1 in which the light pixel 5' that is switched on is located. At the locations in row Z1, column S2, and row Z2, column S1, where the light pixels 5 are switched off, brightness values of 5% are detected, while values of 1% are detected at the light pixel locations in column S1, row Z3, Row Z2, column S2, and column S3, row Z1. No brightness is detected at other locations in the light pixel arrays L1, L1'.

With regard to the second light pixel array L2', a brightness of 60% of the normal brightness (target brightness) is detected in row Z1, column S1 for the light pixel 5" that is switched on there, while at the adjacent locations in row Z1, column S2 and row Z2, column S1, 15% of the brightness is recorded, and in row Z1, column S3, row Z2, column S2, and row Z3, column S1, 5% of the brightness is recorded. No brightness is detected at other locations in the same light pixel array L2'.

The brightness values in the light pixel arrays L1', L2', . . . $L_l'$ are compared with the respective reference patterns, in which the reference patterns R1, . . . $R_t$ have 100% of the standard brightness at the locations where the light pixels 5 are switched on, while at the locations where the light pixels 5 are switched off, they have no brightness. By comparing the recorded light pixel arrays L1', L2' with the reference patterns R1, . . . $R_t$, it is possible to assess the quality of the light sources 2 with regard to their contrast. The contrast of the light pixels 5' in the present exemplary embodiment is therefore greater than the contrast of the light pixels 5".

Quality values can therefore be calculated for the individual light pixels 5 in the evaluation unit 7, which represent the quality of the light source 2. The same applies for determining the quality of the color value. The data from the optical recorder 6 are evaluated for this in the evaluation unit 7 by comparison with corresponding reference values in the reference pattern.

This quality determination method can take place, for example, during the production of the headlamp, such that the quality signal forms an operating control signal 10 for a control unit 11 for the light source 2. If it is determined, as is the case in the present exemplary embodiment, that the light pixels 5" that are switched on in the second light pixel array L2 emit more light at the adjacent light pixel locations that are actually occupied by the other light pixels, and thus the brightness at the light pixel locations of the light pixels 5" that are switched on is comparatively lower, or below a predefined threshold value, this can be compensated for by altering the control signal for the light pixels adjacent to the light pixels 5", e.g. by dimming them. By this means, it can be ensured that the existing light source 2 can be used in the headlamp, and/or the required homogeneity in the light emission, or the intended light distribution on a road surface generated with an optical unit, not shown, can be obtained.

Figure 3:
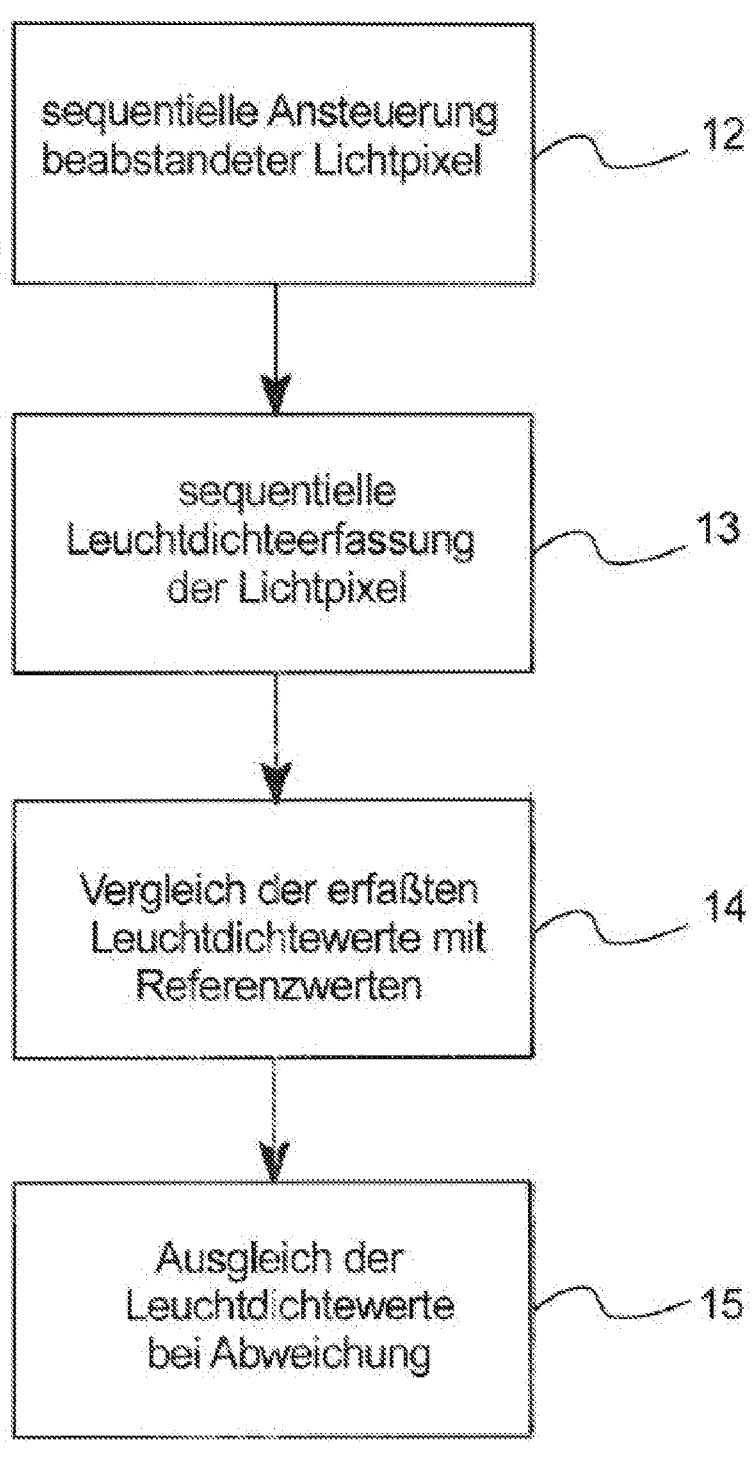
FIG. 3 shows a flow chart for the testing method.

As FIG. 3 shows, the method according to the invention for testing the quality of a light source 2 contains, in block 12, a sequential activation of light pixels 5 in a light source that are spaced apart from one another with the same activation signal, specifically the same switching signal, while the other light pixels are switched off. The testing control unit 3 is connected to a test procedure 16 for this, in which the specifications for the test patterns T1, T2, . . . $T_t$ are stored.

The brightness of the individual light pixels 5 is sequentially recorded with the optical recorder 6 in the next block 13, and the data therefrom is stored in the evaluation unit 7 in the testing device 1. Each test pattern T1, T2, . . . $T_t$ is recorded in this manner, and stored in the evaluation unit 7 as test pattern T1', T2', . . . $T_t'$.

The brightness values are compared with reference data from corresponding reference patterns R1, . . . $R_t$ stored in a reference memory 17 in the evaluation unit 7 in block 14. A sequence of threshold values can be stored in the evaluation unit 7, such that the differences in the brightness values of the respective light pixels 5 to the corresponding reference values can be classified.

Compensation for the brightness values of the light pixels 5 can be calculated in block 15, such that operating control signals 10 can be generated for the individual light pixels 5, which are generated in a control unit 11 for the light source 2 in accordance with a predefined light distribution. The compensating values for generating the operating control signal 10 are based on the light distribution that is to be generated and/or from the optical unit dedicated to the light source 2.

A lower contrast for the light pixels 5 requires a larger matrix for the light pixel arrays L1, L2, . . . $L_l$. With larger light pixel arrays L1, L2, . . . $L_l$, the number of test patterns T1, T2, . . . $T_t$ must be larger.

To test the contrast in the light sources 2, four test patterns T, which each have light pixel arrays L1, L2, . . . $L_l$ in the form of 2×2 matrixes, must be generated sequentially in a first step 20. By comparison with the reference patterns R1, R2, . . . $R_4$ in the evaluation unit 7, it can be determined whether the necessary contrast is obtained. If the comparison results in a negative value, the testing control unit 3 generates a second test row on the basis of another test procedure in a second step 21, in which the light pixel arrays L1, L2, . . . $L_l$ are larger. By way of example, the light pixel array can be a 4×4 matrix, such that 16 test patterns T1, T2, . . . T16 must be generated. This results in a more precise determination of the contrast for the individual light pixels 5.

It should be understood that to determine the contrast, the reference pattern must contain reference brightness values, and to determine the color quality, it must contain reference color values. The evaluations of the brightness and color value therefore take place simultaneously, based on the same test patterns T1, T2, . . . $T_t$.

The actuation unit is part of the headlamp and built into the vehicle, while the testing device 1 is outside the vehicle, and only used for testing purposes, e.g. during production of the headlamp.

LIST OF REFERENCE SYMBOLS

1 testing device
2 light source
3 testing control unit
4 testing control signal
5, 5', 5" light pixels
6 optical recorder
7 evaluation unit
9 testing control signal
10 operating control signal
11 control unit
12 block
13 block
14 block
15 block
16 test procedure
17 reference memory
20 $1^{st}$ step
21 $2^{nd}$ step
T . . . test pattern
L . . . light pixel array
R . . . reference pattern

The invention claimed is:

1. A quality testing method for a light source in a headlamp, wherein the light source contains a matrix of light pixels, the method comprising the steps of:

controlling the light pixels according to a test procedure such that the light source emits light corresponding to a test pattern;

recording the test pattern by an optical recorder;

comparing the test pattern with a reference pattern with regard to brightness and/or color value;

wherein in a first step, test patterns are generated in which the square light pixel arrays contain relatively few light pixels, and the test patterns are scanned and compared with a reference pattern, and when the test pattern differs from the reference pattern by more than a predefined threshold value, further test patterns are generated in a second step, in which the square light pixel arrays contain a greater number of light pixels than in the first step; and wherein an operating control signal is generated for each light pixel based on the comparison of the scanned test pattern with the predefined reference patterns, such that differences in adjacent light pixels with regard to brightness and/or color values are compensated for.

2. The method according to claim 1, wherein a plurality of test patterns are generated and recorded successively by activating different light pixels, wherein the light pixels in the test patterns that are switched on are surrounded by a predefined number of light pixels that are switched off.

3. The method according to claim 2, wherein the test patterns are generated by sequentially activating individual light pixels in a predefined group of light pixels, while other light pixels in the group of light pixels are switched off, and the sequentially generated test patterns are each recorded by the optical recorder.

4. The method according to claim 2, wherein the test patterns are generated in accordance with the test procedure through sequentially activating the individual light pixels in a predefined group of light pixels, wherein the light pixels in the predefined group are contained in a light pixel array, each of which is composed of a square matrix that has the same number of rows and columns.

5. The method according to claim 2, wherein the test patterns are generated in accordance with the test procedure through sequentially activating the light pixels in the respective square light pixel arrays, wherein the light pixels are switched on at the same locations in the square light pixel arrays.

6. The method according to claim 1, wherein the reference pattern is composed of the reference brightness values and/or reference color values assigned to the light pixels.

7. The method according to claim 6, wherein the reference brightness values and/or reference color values for the light pixels that are switched on are the same.

8. The method according to claim 6, wherein the reference brightness values and reference color values are based on a light distribution that is to be generated by the headlamp, and/or an optical unit dedicated to the light source.

9. A testing device for the method according to claim 1, the testing device comprising:

an evaluation unit, in which an operating control signal is generated for each light pixel based on a difference between the test pattern and the reference patterns.

10. The testing device according to claim 9, further comprising a test control unit with which all of the light pixels that are to be switched on in the light pixel array are switched on with the same switching signal.

11. The testing device according to claim 9, wherein the test control unit is configured such that when each test pattern is activated, a single light pixel in the light pixel array is switched on, and the other light pixels in the same light pixel array are switched off.

12. The testing device according to claim 9, wherein the operating control signal can be stored in a memory in a control unit for the headlamp.

13. The testing device according to claim 9, wherein an optical recorder of the testing device is a camera.

* * * * *